(12) United States Patent
Takahashi

(10) Patent No.: US 7,061,373 B2
(45) Date of Patent: Jun. 13, 2006

(54) VEHICLE OBSTACLE DETECTING DEVICE

(75) Inventor: Hiroshi Takahashi, Komae (JP)

(73) Assignee: Nissan Motor Co., Ltd, Yokohama (JP)

( * ) Notice: Subject to any disclaimer, the term of this patent is extended or adjusted under 35 U.S.C. 154(b) by 97 days.

(21) Appl. No.: 10/873,274

(22) Filed: Jun. 23, 2004

(65) Prior Publication Data

US 2005/0012604 A1    Jan. 20, 2005

(30) Foreign Application Priority Data

Jul. 8, 2003    (JP) .............................. 2003-271921

(51) Int. Cl.
 *B60Q 1/00* (2006.01)
(52) U.S. Cl. ........................ 340/435; 340/436; 342/70
(58) Field of Classification Search ................ 340/435, 340/436, 943, 686.6, 932.2, 933, 942, 903, 340/935, 939; 382/103; 701/45; 342/70–72
 See application file for complete search history.

(56) References Cited

U.S. PATENT DOCUMENTS

| | | | |
|---|---|---|---|
| 5,314,037 A * | 5/1994 | Shaw et al. .................. | 180/169 |
| 6,138,062 A | 10/2000 | Usami | |
| 6,337,638 B1 * | 1/2002 | Bates et al. .................. | 340/904 |
| 6,670,910 B1 * | 12/2003 | Delcheccolo et al. ......... | 342/70 |
| 6,753,766 B1 * | 6/2004 | Patchell ...................... | 340/436 |
| 2005/0228588 A1 * | 10/2005 | Braeuchle et al. .......... | 701/301 |

FOREIGN PATENT DOCUMENTS

JP           10-31799 A          2/1998

* cited by examiner

*Primary Examiner*—Jeffery Hofsass
(74) *Attorney, Agent, or Firm*—Shinjyu Global IP Counselors

(57) ABSTRACT

The vehicle obstacle detecting device improves safety of the vehicle by utilizing information detected by a plurality of sensors to appropriately handle situations in which an obstacle exists in a blind spot of the sensors. The vehicle obstacle detecting device includes at least first and second sensors arranged such that sensing scopes of the first and second sensors do not substantially overlap. The vehicle obstacle detecting device is configured to observe the behavior of an obstacle existing within the sensing scope of one of the first and second sensors and predict the blind spot behavior of the obstacle in a blind spot between the sensing scopes of the first and second sensors based on the observed behavior of the obstacle. Thus, the vehicle obstacle detecting device is configured to predict the existence of an obstacle in the blind spot where the first and second sensors cannot actually detect the obstacle.

15 Claims, 9 Drawing Sheets

VEHICLE OBSTACLE DETECTING DEVICE

BACKGROUND OF THE INVENTION

1. Field of the Invention

The present invention relates to a vehicle obstacle detecting device adapted to be mounted on a vehicle. More specifically, the present invention relates to a vehicle obstacle detecting device configured to detect an obstacle in the vicinity of the vehicle by using a plurality of sensors whose sensing scopes do not overlap one another.

2. Background Information

There have been known technologies for detecting obstacles in the vicinity of a moving vehicle in order to improve the driving safety of the vehicle. For example, Japanese Laid-Open Patent Publication No. 10-31799 discloses an automatic travel control device that detects the position of a vehicle with respect to a traveling road or lane and controls the steering of the vehicle. In particular, the automatic travel control device disclosed in the above mentioned reference has a radar and a CCD (charged coupled device) or other cameras mounted onto the vehicle. In order to improve the detection reliability, the camera and the radar are arranged such that their detection scopes overlap to produce a redundancy. Thus, in the above mentioned reference, the detection using both the camera and the radar is executed.

In view of the above, it will be apparent to those skilled in the art from this disclosure that there exists a need for an improved vehicle obstacle detecting device. This invention addresses this need in the art as well as other needs, which will become apparent to those skilled in the art from this disclosure.

SUMMARY OF THE INVENTION

In the conventional technology disclosed in the above mentioned reference and in other such conventional systems, the detection reliability is improved by detecting the obstacle using a plurality of radars and/or cameras. However, in these conventional systems, the degree of freedom regarding the mounting position and the mounting direction of the sensors (e.g., radars and/or cameras) with respect to the vehicle is extremely limited because arrangements in which the sensing scopes of the radars and/or cameras overlap are limited.

Moreover, many of the conventional systems emphasize arranging the sensors such that there is basically no blind spot. On the other hand, there has been a demand for the ability to check the surroundings of the vehicle using as few sensors as possible depending on a system. However, in such conventional systems, as in the case of the technology disclosed in the above mentioned reference, several sensors are used in order to improve the detection reliability. In other words, the conventional systems are not arranged to positively utilize information regarding the blind spot of the sensors.

The present invention was conceived in view of the above mentioned problems in the conventional technologies. Thus, one of the objects of the present invention is to provide a vehicle obstacle detecting device that can effectively utilize information detected by a plurality of sensors to appropriately handle situations in which an obstacle exists in a blind spot of the sensors and improve the safety of the vehicle.

In order to achieve the above mentioned and other objects of the present invention, a vehicle obstacle detecting device adapted to be mounted on a vehicle to detect an obstacle comprises a plurality of sensors, an obstacle behavior observing section, and a blind spot behavior predicting section. The plurality of sensors includes at least a first sensor having a sensing scope that does not substantially overlap a sensing scope of the second sensor thereby defining a blind spot between the sensing scopes of the first and second sensors. The obstacle behavior observing section is configured to observe a behavior of an obstacle within at least the sensing scope of the first sensor. The blind spot behavior predicting section is configured to predict a blind spot behavior of the obstacle in the blind spot between the sensing scopes of the first and second sensors based on the behavior of the obstacle in the sensing scope of the first sensor observed by the obstacle behavior observing section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
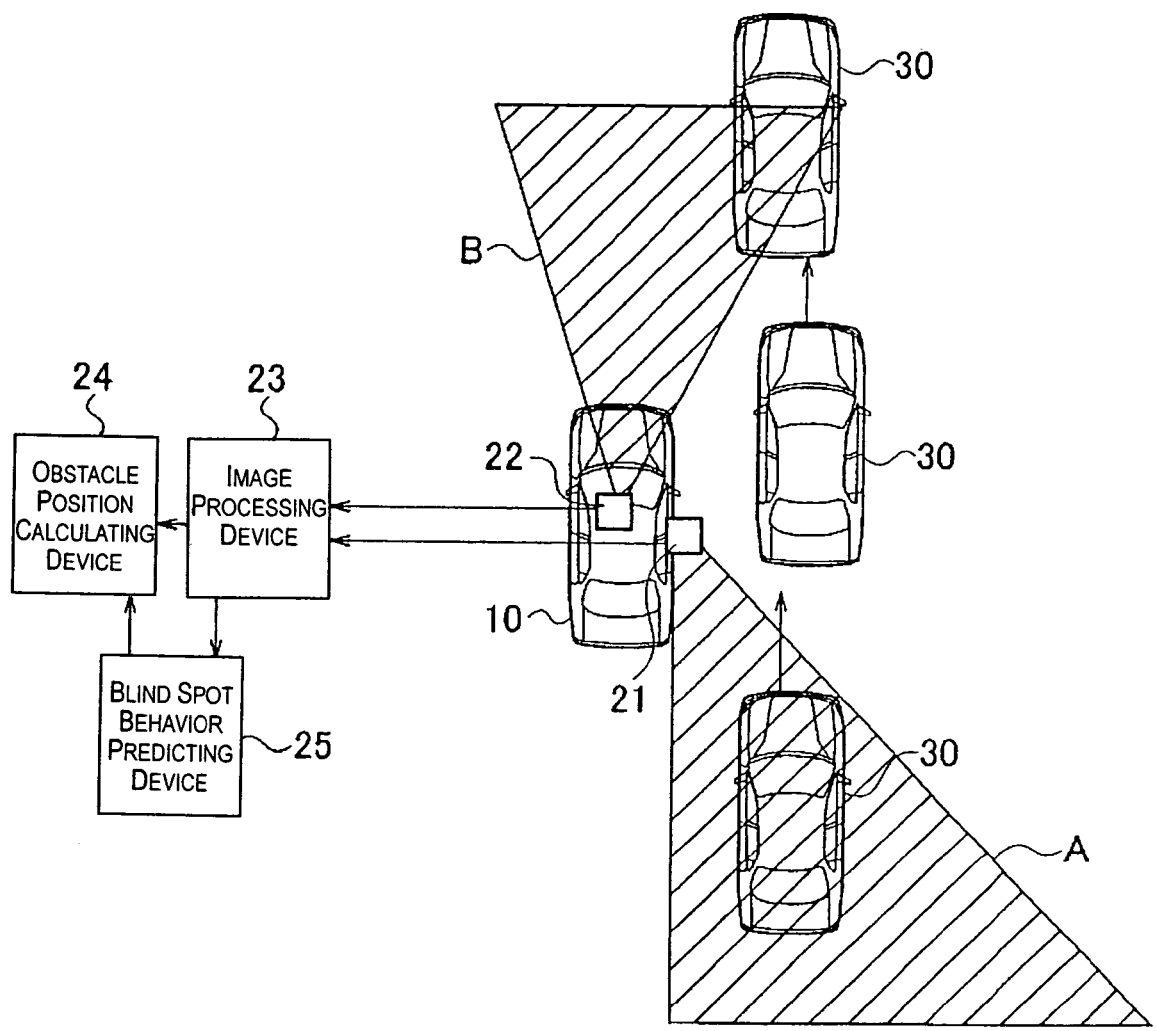
FIG. 1 is a simplified block diagram illustrating a basic configuration of a vehicle obstacle detecting device in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–5, a vehicle obstacle detecting device is illustrated in accordance with a first embodiment of the present invention. The vehicle obstacle detecting device of the present invention is configured to detect the existence of an obstacle in the vicinity of a vehicle 10 while the vehicle 10 is traveling by using a plurality of sensors whose sensing scopes do not substantially overlap one another. As used herein, the sensing scopes that do not substantially overlap one another refer to sensing scopes that define a blind spot between the sensing scopes in which an obstacle is undetectable. For example, two sensing scopes of two sensors do not substantially overlap if a blind spot, in which a behavior of an obstacle is not sufficiently detected by either one of the sensors, exists even there is some overlapping area of the sensing scopes of the two sensors. In the first embodiment of the present invention, the obstacle is explained as a passing vehicle 30 that passes by a side of the vehicle 10 equipped with the vehicle obstacle detecting device. Of course, it will be apparent to those skilled in the art from this disclosure that the obstacle is not limited to a passing vehicle. Rather, any object or person can be considered as an obstacle with respect to the present invention if any contact between the object or the person and the vehicle equipped with the vehicle obstacle detecting device is usually not desirable.

More particularly, the vehicle obstacle detecting device is configured to predict a blind spot behavior, i.e., a behavior of the obstacle when the obstacle is in a blind spot where none of the sensors can actually detect the obstacle, based on the behavior of the obstacle when the obstacle was within the sensing scope of one of the sensors. Thus, the vehicle obstacle detecting device in accordance with the present invention can effectively utilize information detected by the sensors to predict the existence and the behavior of the obstacle in the blind spot. Thus, the vehicle obstacle detecting device in accordance with the present invention can improve safety of the vehicle by appropriately handling situations in which the obstacle exists in the blind spot of the sensors.

Moreover, in the vehicle obstacle detecting device of the present invention, at least one parameter is used to predict the blind spot behavior. The vehicle obstacle detecting device is configured to examine whether the predicted blind spot behavior and the actual behavior of the obstacle match. When the vehicle obstacle detecting device determines the predicted blind spot behavior did not match the actual behavior of the obstacle, the vehicle obstacle detecting device is configured to adjust the at least one parameter used to predict the blind spot behavior of the following obstacles, e.g., the following oncoming vehicles that pass by the vehicle, based on the actual behavior of the obstacle. First, a basic idea is explained as to why it is effective to adjust the at least one parameter used to predict the blind spot behavior of the following vehicles coming after the passing vehicle based on the actual behavior of the passing vehicle.

As described in such publications as *World of Fluctuation-Mystery of 1/f Fluctuation In Nature*—(by Toshimitsu Musha, Kodansha Blue Backs), the flow of traffic has a fluctuating characteristic in which vehicles pass frequently when the same trend continues and hardly any vehicles come at all once the flow is interrupted. Consequently, when a first passing vehicle passes by a side of the vehicle, it is likely that a second passing vehicle will pass by at approximately the same speed as the first passing vehicle. Also, when the first passing vehicle passes by the side of the vehicle while decelerating due to the influence of traffic jam or the like ahead in the direction of travel, the second passing vehicle coming thereafter is likely to pass by the side of the vehicle while decelerating like the first passing vehicle. Of course, these phenomena will vary due to the properties of the individual vehicles if the precise speed and/or deceleration/acceleration of each individual vehicle is rigorously calculated. However, from a macroscopic perspective, it is feasible to believe that the same trend will exist between passing vehicles that pass by the vehicle in sequence.

Accordingly, the vehicle obstacle detecting device in accordance with the first embodiment of the present invention utilizes the aforementioned fluctuating characteristic of the traffic to predict the behavior of the obstacle and applies the parameters used to predict the blind spot behavior of the first obstacle to predict the blind spot behavior of a next obstacle as well. Moreover, based on the observation results related to the first obstacle, the vehicle obstacle detecting device is configured to modify the parameters used to predict the blind spot behavior of the next obstacle as necessary. In the following description of the embodiments of the present invention, two sensors (a first sensor 21 and a second sensor 22) mounted on the vehicle are used to detect obstacles will be used as an example. However, it will be apparent to those skilled in the art from this disclosure that the present invention is not limited to utilizing only two sensors as described below, rather the number of sensors can be varied as required.

As shown in FIG. 1, the vehicle obstacle detecting device of the first embodiment is adapted to be mounted to the vehicle 10 as mentioned above. The vehicle obstacle detecting device basically comprises the first sensor 21 and the second sensor 22 mounted to the vehicle 10, an image processing device 23, an obstacle position calculating device 24 and a blind spot behavior predicting device 25. The image processing device is preferably configured to execute image processing to detection signals issued by the first and second sensors 21 and 22. The obstacle position calculating device 24 is configured to calculate the position of an obstacle. The blind spot behavior predicting device 25 is configured to predict the behavior of the obstacle in a blind spot.

The image processing device 23 and the obstacle position calculating device 24 preferably constitute an obstacle behavior observing section configured to observe the behavior of an obstacle existing within the sensing scope of one of the first sensor 21 and the second sensor 22. The blind spot behavior predicting device 25 preferably constitute a blind spot behavior predicting section configured to predict the behavior of the obstacle in a blind spot based on the behavior of the obstacle observed by the obstacle behavior observing section.

The first sensor 21 is, for example, a video camera whose sensing scope is a prescribed region extending rearward on the right side of the vehicle 10, as indicated by a shaded portion A in FIG. 1. Thus, when the passing vehicle 30, i.e., a moving obstacle, passes on the right side of the vehicle 10, the first sensor 21 is configured to detect the passing vehicle 30 when the passing vehicle 30 reaches a position rightward and rearward of the vehicle 10. A detection signal issued by the first sensor 21 is fed to the image processing device 23.

The second sensor 22 is, for example, a video camera whose sensing scope is a prescribed region extending forward in front of the vehicle 10, as indicated by a shaded portion B in FIG. 1. Thus, when the passing vehicle 30 passes on the right side of the vehicle 10, the second sensor 22 can detect the passing vehicle 30 when the passing vehicle 30 reaches a position rightward and forward of the vehicle 10. A detection signal issued by the second sensor 22 is fed to the image processing device 23. As seen in FIG. 1, the first and second sensors 21 and 22 are preferably arranged such that the sensing scope A of the first sensor 21 and the sensing scope B of the second sensor 22 do not substantially overlap each other. In other words, there exists a blind spot between the sensing scope A of the first sensor 21 and the sensing scope B of the second sensor 22 where neither of the first and second sensors 21 and 22 can detect the obstacle. Of course, it will be apparent to those skilled in the art from this disclosure that the arrangements of the first and second sensors 22 and the sensing scopes of the first and second sensors 21 and 22 are not limited to the arrangement shown in FIG. 2. For example, the first and second sensors 21 and 22 can be arranged such that these sensors detect a passing vehicle that passes by a left side of the vehicle 10, or detect an object behind the vehicle 10.

The image processing device 23 is configured to execute a prescribed image processing with respect to the detection signals issued by the first sensor 21 and/or the second sensor 22 to generate an image of the obstacle. The image processing device 23 is further configured to deliver the generated image signal to the obstacle position calculating device 24 and the blind spot behavior predicting device 25.

Figure 2:
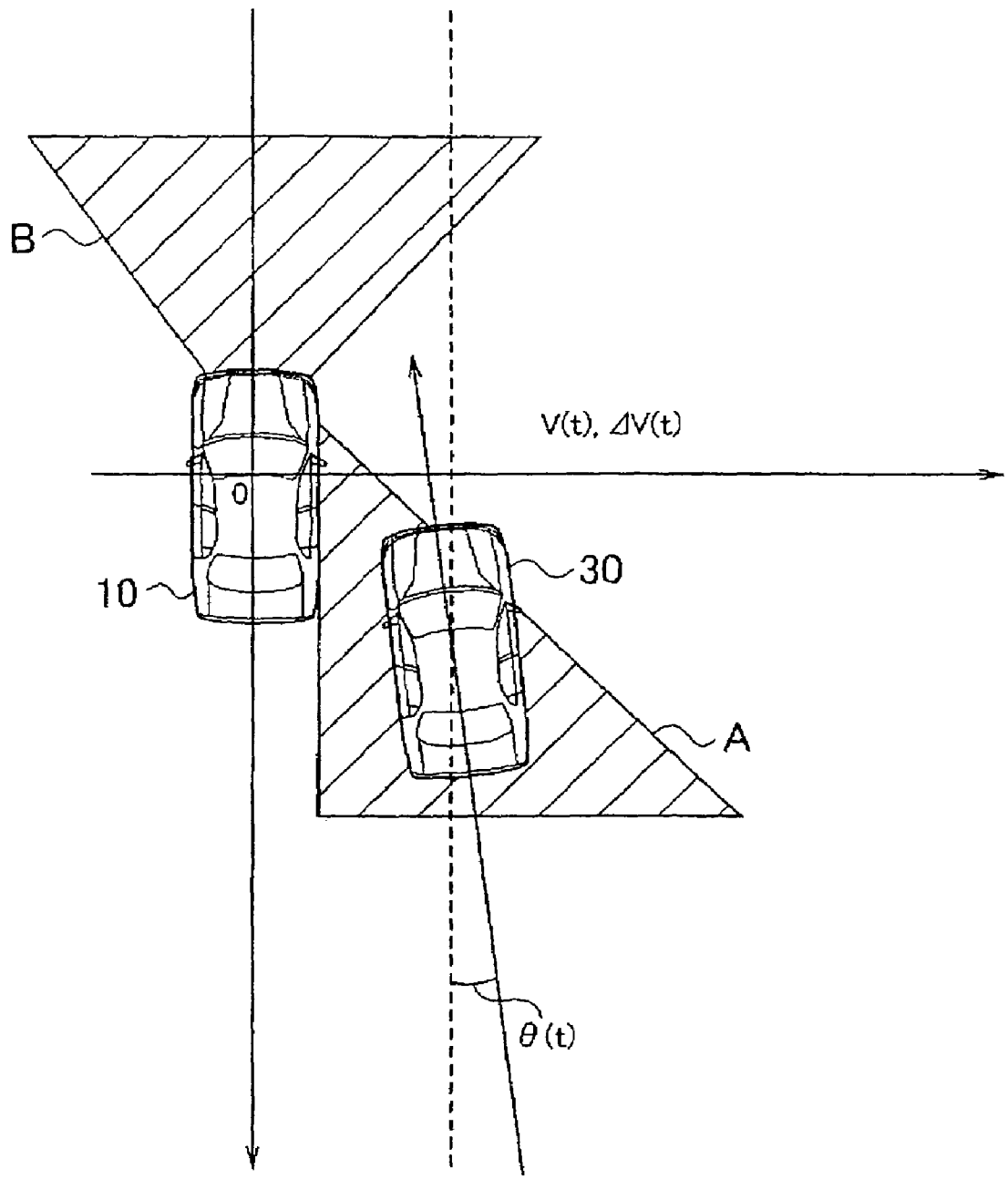
FIG. 2 is a diagrammatic view for explaining how a position of an obstacle (e.g., passing vehicle) is calculated on a two-dimensional coordinate system whose origin is located at a center of a vehicle equipped with the vehicle obstacle detecting device in accordance with the first embodiment of the present invention.

The obstacle position calculating device 24 is configured to calculate the position of the obstacle based on the image signal delivered from the image processing device 23 and a prediction signal delivered from the blind spot behavior predicting device 25. More specifically, the first sensor 21 and the image processing device 23 are configured to detect that a passing vehicle 30 is traveling at a relative velocity V(t) and a relative acceleration ΔV(t) with respect to the vehicle 10 and with a bearing angle θ(t) with respect to the traveling direction of the vehicle 10 as shown in FIG. 2. Then, the obstacle position calculating device 24 is configured to calculate the position of the passing vehicle 30 on a two-dimensional coordinate system whose origin is located at the center of the vehicle 10 as shown in FIG. 2 based on the image signal delivered from the image processing device 23 and the prediction signal delivered from the blind spot behavior predicting device 25.

The blind spot behavior predicting device 25 is configured to predict the behavior of the obstacle in the region between the sensing scope of the first sensor 21 and the sensing scope of the second sensor 22, i.e., blind spot, based on the image signal delivered from the image processing device 23. The blind spot behavior predicting device 25 is further configured to deliver a prediction signal comprising predicted parameters to the obstacle position calculating device 24.

Accordingly, the vehicle obstacle detecting device of the present invention is configured to detect the existence of the obstacle in the vicinity of the vehicle 10. More specifically, the obstacle in the vicinity of the vehicle 10 is detected in the vehicle obstacle detecting device of the present invention by following the processing sequence explained with reference to the flowcharts of FIGS. 3 and 4.

Figure 3:
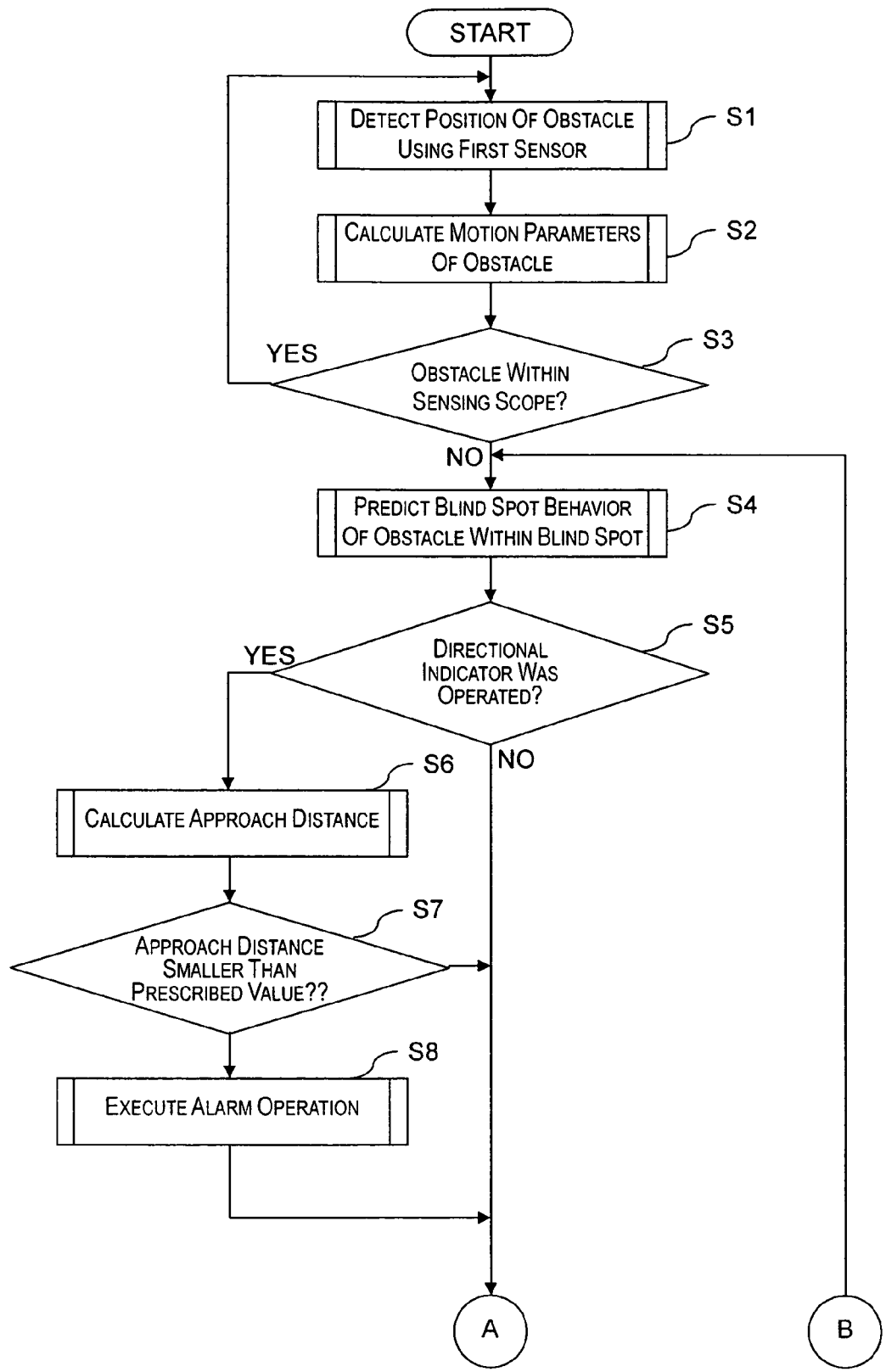
FIG. 3 is a first portion of a flowchart for explaining a processing sequence executed by the vehicle obstacle detecting device in order to detect the existence of the obstacle in the vicinity of the vehicle in accordance with the first embodiment of the present invention.

First, in step S1 shown in FIG. 3, if the first sensor 21 (whose sensing scope is a prescribed region located rightward and rearward of the vehicle 10) detects an obstacle (e.g., the passing vehicle 30), the image processing device 23 and the obstacle position calculating device 24 are configured to calculate the position of the obstacle based on the detection signal from the first sensor 21. The image processing device 23 and the obstacle position calculating device 24 are configured to calculate the position of the obstacle using a conventional image processing technology like that explained previously with reference to FIG. 2.

Next, in step S2, the vehicle obstacle detecting device is configured to compute a plurality of motion parameters regarding the behavior or motion of the obstacle. More specifically, the vehicle obstacle detecting device is configured to observe the relative velocity V(t), the relative acceleration ΔV(t), and the bearing angle θ(t) of the obstacle with respect to the vehicle 10.

In step S3, the vehicle obstacle detecting device is configured to determine if the obstacle remains in the sensing scope of the first sensor 21. If the vehicle obstacle detecting device determines that the obstacle still remains in the sensing scope of the first sensor 21, the vehicle obstacle detecting device is configured to repeat the processing from step S1 to step S3 to continue observing the obstacle in the sensing scope of the first sensor 21. On the other hand, if the vehicle obstacle detecting device determines that the obstacle has departed from the sensing scope of the first sensor 21, then the vehicle obstacle detecting device is configured to presume that the obstacle is passing through the blind spot and moving towards the sensing scope of the second sensor 22, whose sensing scope is a prescribed region located forward of the vehicle 10. Since the actual region that can be detected by the first sensor 21 is known in advance by the obstacle position calculating device 24, the vehicle obstacle detecting device can easily observe that the position of the obstacle has moved outside the sensing scope of the first sensor 21 in the process of tracing the position of the obstacle using the first sensor 21.

Next, in step S4, the vehicle obstacle detecting device is configured to start the blind spot behavior predicting device 25 that is configured to predict the behavior of the obstacle in the blind spot based on the initial values of vehicle behavior parameters (vectors) such as the relative velocity V(t), the relative acceleration ΔV(t), and the bearing angle θ(t) of the obstacle with respect to the vehicle 10. More specifically, the vehicle obstacle detecting device is preferably configured to execute prediction processing that calculates the predicted time when the obstacle will appear in the sensing scope of the second sensor 22.

Figure 5:
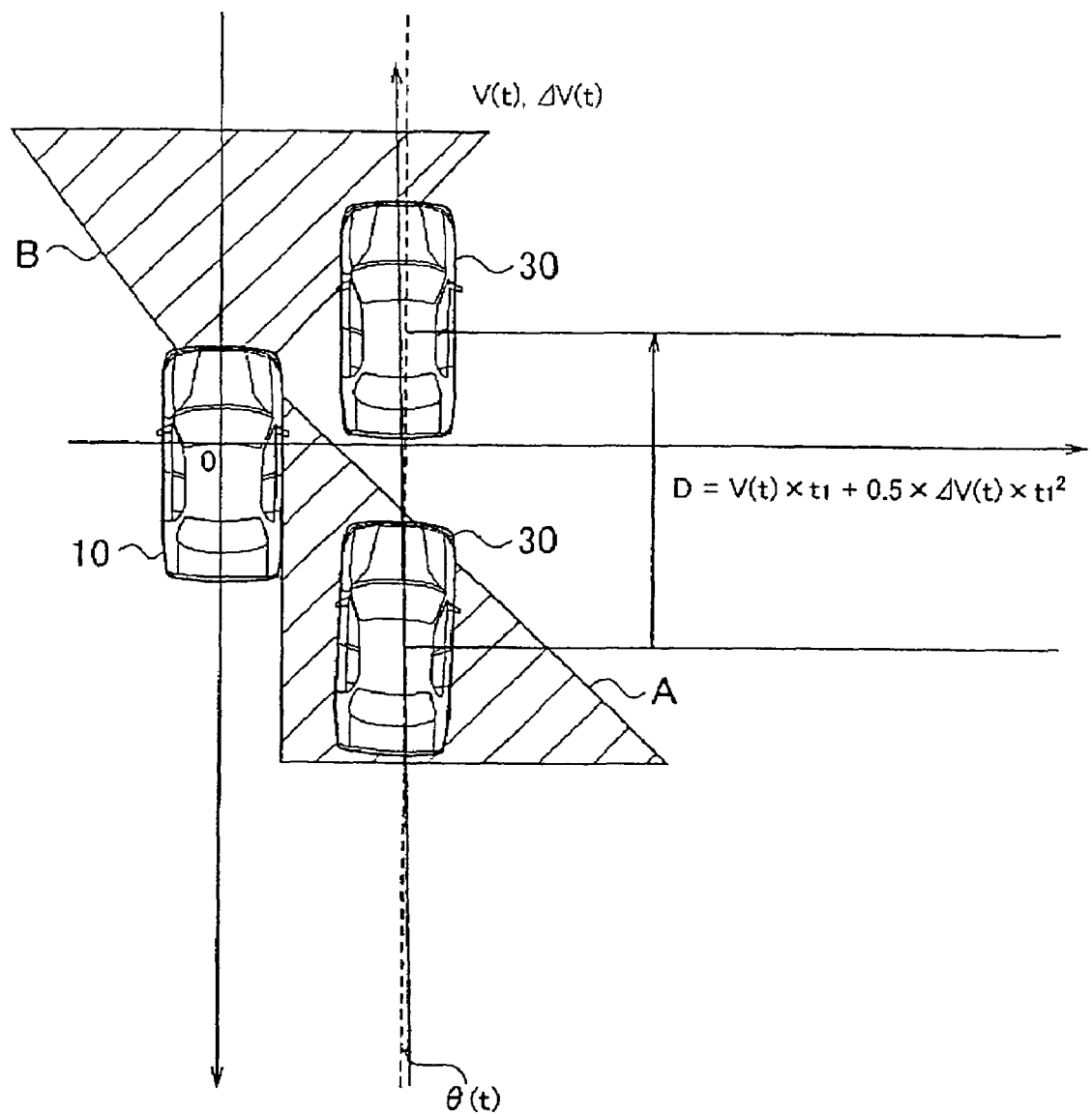
FIG. 5 is a diagrammatic view for explaining how to obtain a predicted time calculated from when the obstacle (e.g., passing vehicle) enters the blind spot between first and second sensors until the obstacle appears in the sensing scope of the second sensor whose sensing scope is set in front of the vehicle equipped with the vehicle obstacle detecting device in accordance with the first embodiment of the present invention.

For example, based on the positional relationship between the vehicle 10 and the obstacle, i.e., the passing vehicle 30, shown in FIG. 2, the time at the moment when the passing vehicle 30 entered the blind spot is assumed to be t, where the parameters observed in step S2 are the relative velocity V(t), the relative acceleration ΔV(t), and the bearing angle θ(t). Also, the traveling speed of the vehicle 10 is assumed to be VS(t). The amount of time from when the passing vehicle 30 enters the blind spot until the passing vehicle 30 appears in the sensing scope of the second sensor 22 can be calculated using simple geometrical concepts. For example, as shown in FIG. 5, the distance D from the position of the passing vehicle 30 when it exists inside the sensing scope of the first sensor 21 to the position of the passing vehicle 30 when it appears in the sensing scope of the second sensor 22 is known in advance. Assuming the amount of time from when the passing vehicle 30 enters the blind spot until it appears in the sensing scope of the second sensor 22 is t1, then the distance D can be expressed according to the following Equation (1). Thus, the vehicle obstacle detecting device can easily calculate the amount of time t1 and predict that the passing vehicle 30 will appear in the sensing scope of the second sensor 22 at time t+t1.

$$D=V(t) \times t1 + 0.5 \times \Delta V(t) \times t1^2 \qquad (1)$$

Accordingly, the vehicle obstacle detecting device is configured to predict the behavior of the obstacle in the blind spot. Moreover, the vehicle obstacle detecting device is configured to execute an alarm operation or the like as required based on the blind spot behavior (e.g., predicted positions) of the obstacle.

More specifically, in step S5 in FIG. 3, the vehicle obstacle detecting device determines whether the driver of the vehicle 10 has operated the directional indicator that indicates the vehicle 10 is moving toward the side where the obstacle is predicted to exist in the blind spot.

Figure 4:
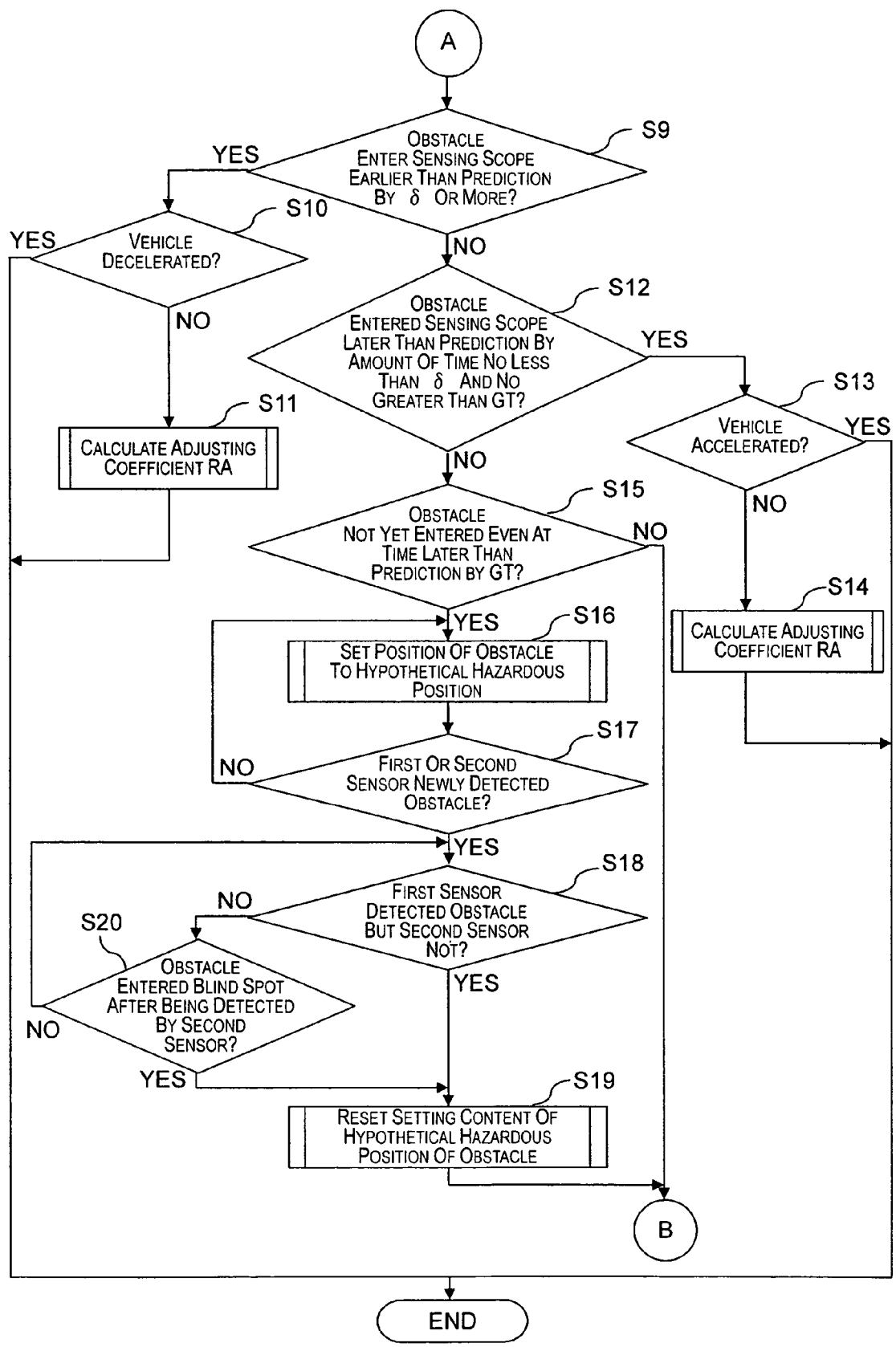
FIG. 4 is a second portion of a flowchart for explaining the processing sequence, continued from the flowchart of FIG. 3, executed by the vehicle obstacle detecting device in order to detect the existence of the obstacle in the vicinity of the vehicle in accordance with the first embodiment of the present invention.

If the vehicle obstacle detecting device determines that the directional indicator has not been operated, the vehicle obstacle detecting device is configured to determine that there is no possibility of contact with the obstacle and proceed to step S9 of FIG. 4.

On the other hand, if the vehicle obstacle detecting device determines that the directional indicator has been operated, the vehicle obstacle detecting device is configured to proceed to step S6 and calculate an approach distance between the vehicle 10 and the predicted position of the obstacle. Then, in step S7, the vehicle obstacle detective device is configured to determine if the approach distance is smaller than a prescribed value.

If the vehicle obstacle detecting device determines that approach distance is not smaller than the prescribed value, the vehicle obstacle detecting device is configured to determine that there is no possibility of contacting with the obstacle and proceed to step S9 of FIG. 4. On the other hand, if the vehicle obstacle detecting device determines that the approach distance is smaller than the prescribed value, the vehicle obstacle detecting device is configured to determine that there is a possibility of contacting with the obstacle and proceed to step S8. In step S8, the vehicle obstacle detecting device is configured to execute a prescribed alarm operation using an alarm means (not shown) to alert the driver of the vehicle 10 of the possibility of contact with the obstacle. Then, the vehicle obstacle detecting device is configured to proceed to step S9 of FIG. 4.

Thereafter, the vehicle obstacle detecting device is configured to execute processing for modifying the parameters to be used to predict the blind spot behavior of the next obstacle as necessary by using the image processing device 23 and the obstacle position calculating device 24. In other words, the parameters used for the prediction of the blind spot behavior of the next obstacle made in step S4 are adjusted according to the actual behavior of the current obstacle.

First, as shown in FIG. 4, in step S9 the vehicle obstacle detecting device is configured to determine if the obstacle has appeared in the sensing scope of the sensor 22 at a time that is earlier than the predicted time t+t1 by a prescribed amount of time δ or more. This situation could occur if the vehicle 10 decelerated or the obstacle accelerated while the obstacle was in the blind spot.

If the vehicle obstacle detecting device determines that the obstacle appeared in the sensing scope of the sensor 22 at a time that is earlier than the predicted time t+t1 by a prescribed amount of time δ or more in step S9, then the vehicle obstacle detecting device is configured to determine if the vehicle 10 decelerated while the obstacle was in the blind spot in step S10.

If the vehicle obstacle detecting device determines that the vehicle 10 decelerated while the obstacle was in the blind spot in step S10, the vehicle obstacle detecting device is configured to determine that the prediction of the blind spot behavior of the obstacle was accurate. Thus, the vehicle obstacle detecting device is configured to end the processing sequence without adjusting the parameters.

On the other hand, if the vehicle obstacle detecting device determines that the vehicle 10 did not decelerate while the obstacle was in the blind spot in step S10, the vehicle obstacle detecting device is configured to determine that the obstacle accelerated while the obstacle was in the blind spot. Thus, the vehicle obstacle detecting device is configured to adjust the parameters used for predicting the blind spot behavior of the obstacle in step S11.

More specifically, in step S11, the vehicle obstacle detecting device is configured to calculate the acceleration SC(t) of the obstacle based on the time t when the obstacle entered the blind spot, an actual time t1' when the obstacle was actually detected by the second sensor 22, and the movement distance D of the obstacle within the blind spot. Then, the vehicle obstacle detecting device is configured to calculate an adjusting coefficient RA based on the acceleration SC(t) and the relative velocity ΔV(t) of the obstacle used in step S4. The adjusting coefficient RA can be calculated using the following Equation (2). The vehicle obstacle detecting device is configured to adjust the parameters used to predict the blind spot behavior of the next obstacle by the adjusting coefficient RA. In other words, the vehicle obstacle detecting device is configured to use the parameters modified with the adjusting coefficient RA to obtain the predicted time of the next obstacle. The default value of the adjusting coefficient RA is preferably set to 1.

$$RA=SC(t)/\Delta V(t) \qquad (2)$$

After calculating the adjusting coefficient RA in step S11, the vehicle obstacle detecting device is configured to end the processing sequence.

If in step S9 the vehicle obstacle detecting device determines that the obstacle did not appear in the sensing scope of the second sensor 22 at a time that is earlier than the predicted time t+t1 by a prescribed amount of time δ or more, then the vehicle obstacle detecting device is configured to proceed to step S12. In step S12, the vehicle obstacle detecting device is configured to make a determination as to whether the obstacle appeared in the sensing scope of the second sensor 22 at a time that is later than the predicted time t+t1 by an amount of time no less than the prescribed amount of time δ and no greater than a prescribed amount of time GT. This situation could occur if the obstacle decelerated or the vehicle 10 accelerated while the obstacle was in the blind spot.

If the vehicle obstacle detecting device determines that the obstacle appeared in the sensing scope of the second sensor 22 at a time that is later than the predicted time t+t1 by an amount of time no less than the prescribed amount of time δ and no greater than a prescribed amount of time GT in step S12, then the vehicle obstacle detecting device is configured to determine if the vehicle 10 accelerated while the obstacle was in the blind spot in step S13.

If the vehicle obstacle detecting device determines that the vehicle 10 accelerated while the obstacle was in the blind spot in step S13, the vehicle obstacle detecting device is configured to determine that the prediction time was correct, and the processing sequence ends without adjusting the parameters.

On the other hand, if the vehicle obstacle detecting device determines that the vehicle 10 did not accelerated while the obstacle was in the blind spot in step S13, the vehicle obstacle detecting device is configured to determine that the obstacle decelerated while the obstacle was in the blind spot. Thus, the vehicle obstacle detecting device is configured to adjust the parameters used for predicting the blind spot behavior of the next obstacle in step S13.

More specifically, in step S14, the vehicle obstacle detecting device is configured to calculate the acceleration SC(t) of the obstacle based on the time t when the obstacle entered the blind spot, the actual time t1' when the obstacle was detected by the second sensor 22, and the movement distance D of the obstacle within the blind spot. Then, the vehicle obstacle detecting device is configured to calculate the adjusting coefficient RA based on the acceleration SC(t) and the relative velocity $\Delta V(t)$ used in step S4. This processing is the same as that of step S10. In other words, the Equation (2) used in step S11 is preferably utilized to calculate the adjusting coefficient RA. After calculating the adjusting coefficient RA, the vehicle obstacle detecting device is configured to end the processing sequence.

If in step S12 the vehicle obstacle detecting device determines that the obstacle did not appear in the sensing scope of the second sensor 22 at a time that is later than the predicted time t+t1 by an amount of time no less than a prescribed amount of time $\delta$ and no greater than a prescribed amount of time GT, then in step S15 the vehicle obstacle detecting device is configure to determine whether the obstacle has appeared in the sensing scope of the second sensor 22 at a time later than the predicted time t+t1 by an amount of time equal to or greater than the prescribed amount of time GT.

If the vehicle obstacle detecting device determines that the obstacle appeared in the sensing scope of the second sensor 22 at a time that is later than the predicted time t+t1 by an amount of time that is less than the prescribed amount of time GT, then the vehicle obstacle detecting device is configured to repeat the processing from step S4 of FIG. 3.

On the other hand, if the vehicle obstacle detecting device determines that the obstacle has not appeared in the sensing scope of the second sensor 22 at a time later than the predicted time t+t1 by an amount of time equal to or greater than the prescribed amount of time GT, then the vehicle obstacle detecting device is configured to determine the relative positional relationship between the vehicle 10 and the obstacle has not changed, and the vehicle 10 and the obstacle are traveling while remaining adjacent to each other as the obstacle remains in the blind spot. In such a case, it is difficult for the vehicle obstacle detecting device to directly ascertain changes in the relative positional relationship between the vehicle 10 and the obstacle. Thus, in such a case, the blind spot behavior predicting device 25 cannot make a precise prediction of the blind spot behavior of the obstacle.

Therefore, in step S16, the vehicle obstacle detecting device is configured to use the obstacle position calculating device 24 to artificially or hypothetically set the position of the obstacle to a hypothetical hazardous position that is dangerously close to the vehicle 10. Then the vehicle obstacle detecting device is configured to execute the alarm operation by the alarm device (not shown) used in steps S5 to S8. In other words, if the vehicle obstacle detecting device determines the directional indicator is operated to indicate the vehicle 10 is moving toward the hypothetical position of the obstacle, the vehicle obstacle detecting device is configured to alert the driver of the possibility of contacting the obstacle by utilizing the alarm device. Of course, it will be apparent to those skilled in the art from this disclosure that an alarm device that is different from the alarm device used in step S8 can also be used as long as the alarm device is configured to alert the driver of a possible contact with the obstacle.

In step S17, the vehicle obstacle detecting device is configured to determine whether the first sensor 21 or the second sensor 22 has newly detected the obstacle.

If the vehicle obstacle detecting device determines that neither the first sensor 21 nor the second sensor 22 has newly detected the obstacle, the vehicle obstacle detecting device is configured to repeat step S16 and continue to set the position of the obstacle to a hypothetical hazardous position.

On the other hand, if the vehicle obstacle detecting device determines that the first sensor 21 or the second sensor 22 has newly detected the obstacle in step S17, then the vehicle obstacle detecting device is configured to determine which of the first and second sensors 21 and 22 has detected the object in step S18.

If the vehicle obstacle detecting device determines that the first sensor 21 has newly detected the obstacle but not the second sensor 22 in step S18, the vehicle obstacle detecting device is configured to reset the setting content of step S16 (i.e., the hypothetical hazardous position of the obstacle) and set the position of the obstacle to the position actually detected by the first sensor 21 in step S19. Then the vehicle obstacle detecting device is configured to repeat the processing from step S4 of FIG. 3.

On the other hand, if the vehicle obstacle detecting device determines that the first sensor 21 did not detect the obstacle in step S18, the vehicle obstacle detecting device is configured to determine whether the obstacle entered the blind spot after being detected by the second sensor 22 in step S20.

If the vehicle obstacle detecting device determines that the obstacle has not been entered the blind spot after being detected by the second sensor 22, the vehicle obstacle detecting device is configured to repeat the processing from step S18. Conversely, if the vehicle obstacle detecting device determines that the obstacle entered the blind spot after being detected by the second sensor 22 in step S18 (e.g., when the passing vehicle 30 decelerates after entering the sensing scope of the second sensor 22), then the vehicle obstacle detecting device is configured to proceed to step S19. In step S19, the vehicle obstacle detecting device is configured to reset the setting content of step S16 (i.e., the hypothetical hazardous position of the obstacle). Then, the vehicle obstacle detecting device is configured to proceed to step S4 of FIG. 3.

Accordingly, by executing a processing sequence as described in the flowcharts of FIGS. 3 and 4, the vehicle obstacle detecting device of the present invention is configured to predict the blind spot behavior of an obstacle when the obstacle is in the blind spot based on the obstacle behavior detected by one of the first sensor 21 and the second sensor 22.

As described above, the vehicle obstacle detecting device in accordance with the first embodiment has two sensors, i.e., the first sensor 21 and the second sensor 22. The first and second sensors 21 and 22 are configured such that the sensing scopes of the first and second sensors 21 and 22 do not substantially overlap. The vehicle obstacle detecting device is configured to observe the behavior of an obstacle existing in the sensing scope of one of the first and second sensors 21 and 22 and predict the blind spot behavior of the obstacle in the blind spot between the sensing scopes of the first and second sensors 21 and 22. As a result, the vehicle obstacle detecting device can predict the existence of the obstacle in the blind spot where the first and second sensors 21 and 22 cannot actually detect the obstacle. Thus, the safety of the vehicle 10 is improved.

Furthermore, when the obstacle departs the sensing scope of the first sensor 21 and enters the sensing scope of the second sensor 22 and the predicted time when the obstacle will enters the sensing scope of the second sensor 22 is different from the actual time of the obstacle actually observed by the second sensor, the vehicle obstacle detecting device is configured to adjust the parameters used by the blind spot behavior predicting device 25 to predict the blind spot behavior by using the image processing device 23 and the obstacle position calculating device 24. The adjustment is preferably based on the difference between the predicted time and the actual time. As a result, the vehicle obstacle detecting device can accurately predict the behavior of obstacles in subsequent executions of the processing sequence.

Moreover, if the obstacle exhibits unanticipated behavior and it is difficult for the blind spot behavior predicting device 25 to predict the blind spot behavior of the obstacle, the vehicle obstacle detecting device is configured to artificially set the position of the obstacle to, for example, a prescribed hypothetical hazardous position that is deemed to be dangerously close to the vehicle 10 by using the image processing device 23 and the obstacle position calculating device 24. Thus, a hazardous situation can be avoided even in situations where the blind spot behavior of the obstacle cannot be predicted.

Furthermore, the vehicle obstacle detecting device of the present invention is configured to urge caution on the driver when appropriate by executing an alarm operation based on the position of the obstacle predicted by the blind spot behavior predicting device 25 and a behavior of the vehicle 10 as indicated by, for example, operation of a directional indicator.

Second Embodiment

Figure 6:
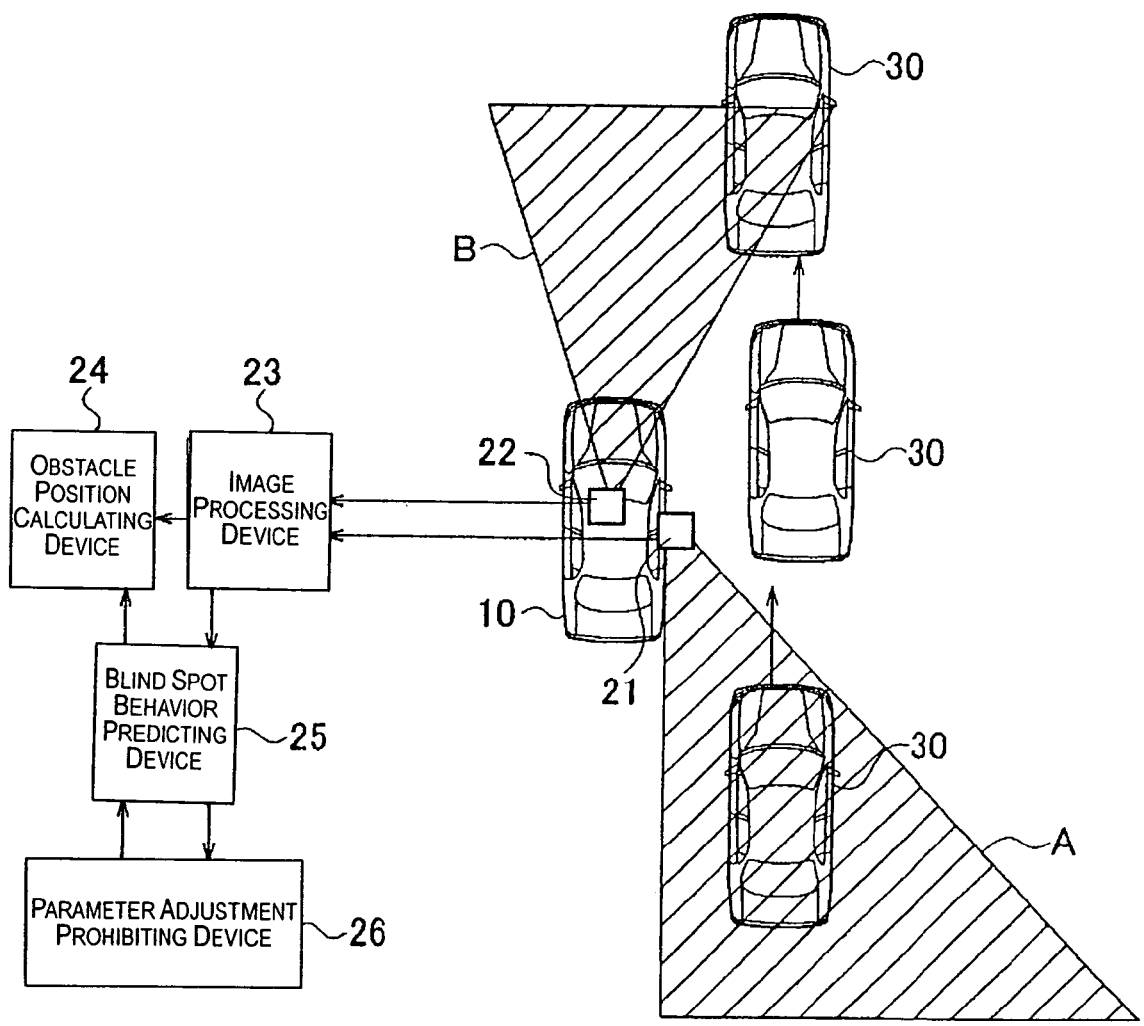
FIG. 6 is a simplified block diagram illustrating a basic configuration of a vehicle obstacle detecting device in accordance with a second embodiment of the present invention.
Figure 7:
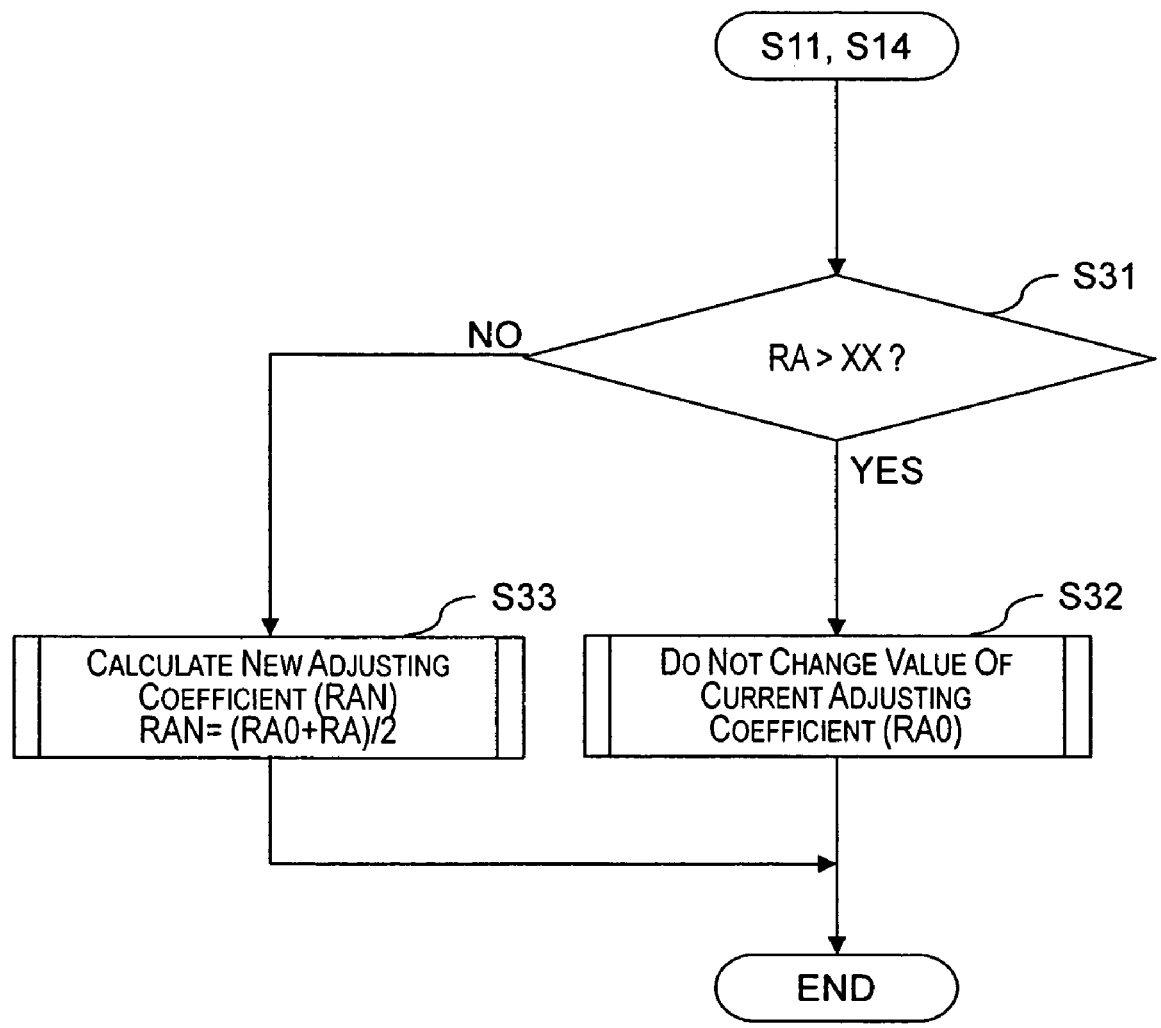
FIG. 7 is a flowchart for explaining a processing sequence for determining whether or not parameters for determining a blind spot behavior of the obstacle should be modified executed by the vehicle obstacle detecting device in accordance with the second embodiment of the present invention.

Referring now to FIGS. 6–7, a vehicle obstacle detecting device in accordance with a second embodiment will now be explained. In view of the similarity between the first and second embodiments, the parts of the second embodiment that are identical to the parts of the first embodiment will be given the same reference numerals and step numbers as the parts of the first embodiment. Moreover, the descriptions of the parts of the second embodiment that are identical to the parts of the first embodiment may be omitted for the sake of brevity.

Basically, the second embodiment of the present invention is identical to the first embodiment, except that the adjustment of the prediction parameter is prohibited when the difference between the predicted blind spot behavior and the actual behavior of the obstacle is extremely large, e.g., larger than a prescribed value. Since the other configurations of the vehicle obstacle detecting device of the second embodiment is identical to the vehicle obstacle detecting device of the first embodiment, the vehicle obstacle detecting device of the second embodiment will be described while focusing chiefly on the distinctive features thereof.

As shown in FIG. 6, in addition to the first sensor 21, the second sensor 22, the image processing device 23, the obstacle position calculating device 24, and the blind spot behavior predicting device 25, the vehicle obstacle detecting device of the second embodiment comprises a parameter adjustment prohibiting device 26. The parameter adjustment prohibiting device 26 is configured to prevent adjustment of the parameters used by the blind spot behavior predicting device 25 to predict the blind spot behavior of the obstacle. The parameter adjustment prohibiting device 26 preferably constitute a parameter adjustment prohibiting section.

When the obstacle departs the sensing scope of the first sensor 21 and enters the sensing scope of the second sensor 22 and it is determined that there is a difference between the predicted position of the obstacle obtained by the blind spot behavior predicting device 25 and the actual position of the obstacle actually observed by the second sensor 22, the parameter adjustment prohibiting device 26 is configured to determine based on the difference whether or not to prohibit adjustment of the parameters used by the blind spot behavior predicting device 25 to predict the blind spot behavior of the obstacle. More specifically, when the difference between the predicted position of the obstacle obtained by the blind spot behavior predicting device 25 and the actual position of the obstacle actually observed by the other sensor is excessively large, it is reasonable to consider the obstacle as a special exception in which a movement rate of the obstacle inside the blind spot is excessively large. Thus, the parameter adjustment prohibiting device 26 is configured to prohibit adjustment of the parameters used by the blind spot behavior predicting device 25 to predict the behavior of the obstacle based on the difference between the predicted position and the actual position of the obstacle. The parameter adjustment prohibiting device 26 is configured to deliver a control signal indicating whether or not to prohibit parameter adjustment to the blind spot behavior predicting device 25.

The vehicle obstacle detecting device of the second embodiment is configured to execute basically the same processing sequence as described in the flowchart of FIGS. 3 and 4 in order to detect the existence of an obstacle in the vicinity of the vehicle 10. Moreover, the vehicle obstacle detecting device of the second embodiment further execute the processing executed by the parameter adjustment prohibiting device 26 to determine whether or not the parameters should be adjusted.

More specifically, after the adjusting coefficient RA is calculated in step S11 or S14 of FIG. 4, the vehicle obstacle detecting device of the second embodiment is configured to execute the processing shown in a flowchart of FIG. 7 instead of ending the processing sequence of FIG. 4.

In step S31 of FIG. 7, the parameter adjustment prohibiting device 26 of the vehicle obstacle detecting device is configured to determine if the calculated adjusting coefficient RA is larger than a preset prescribed value XX.

If the parameter adjustment prohibiting device 26 determines that the calculated adjusting coefficient RA is larger than the prescribed value XX in step S31, the vehicle obstacle detecting device is configured to proceed to step S32 where the processing sequence ends without changing the value of the current adjusting coefficient RA0 (i.e., the adjusting coefficient calculated in the previous execution of the processing sequence). In other words, if the calculated adjusting coefficient RA is larger than the prescribed value XX, the vehicle obstacle detecting device is configured to end the processing without applying the calculated adjusting coefficient RA to the adjustment of the parameters.

On the other hand, if the vehicle obstacle detecting device determines that the calculated adjusting coefficient RA is smaller than the preset prescribed value XX in step S31, the vehicle obstacle detecting device is configured to proceed to step S33 where a new adjusting coefficient RAN is calculated. Then, the new adjusting coefficient RAN is applied to the adjustment of the parameters. More specifically, the vehicle obstacle detecting device is preferably configured to use the following Equation (3) to calculate the new adjusting coefficient RAN based on the current adjusting coefficient (the adjusting coefficient calculated in the previous execution of the processing sequence) RA0 and the adjusting coefficient RA calculated in the current execution of the processing sequence. Then, using the new adjusting coefficient RAN, the vehicle obstacle detecting device is configured to adjust the parameters used by the blind spot behavior adjusting device 25 to predict the blind spot behavior of the obstacle.

$$RAN=(RA0+RA)/2 \qquad (3)$$

Therefore, by executing a processing sequence described above, the vehicle obstacle detecting device can predict the blind spot behavior of the obstacle in the blind spot after the parameter adjustment prohibiting device 26 determines whether or not the prediction parameters should be adjusted.

Accordingly, in the vehicle obstacle detecting device in accordance with the second embodiment, the parameter adjustment prohibiting device 26 is configured to prohibit adjustment of the parameters used by the blind spot behavior predicting device 25 to predict the blind spot behavior of the obstacle when an exceptional case exists in which the moving rate of the obstacle inside the blind spot is excessively large. As a result, the vehicle obstacle detecting device of the second embodiment can prevent the prediction of the blind spot behavior of the obstacles from degrading by imprudently adjusting the parameters based on these exceptional cases.

Third Embodiment

Figure 8:
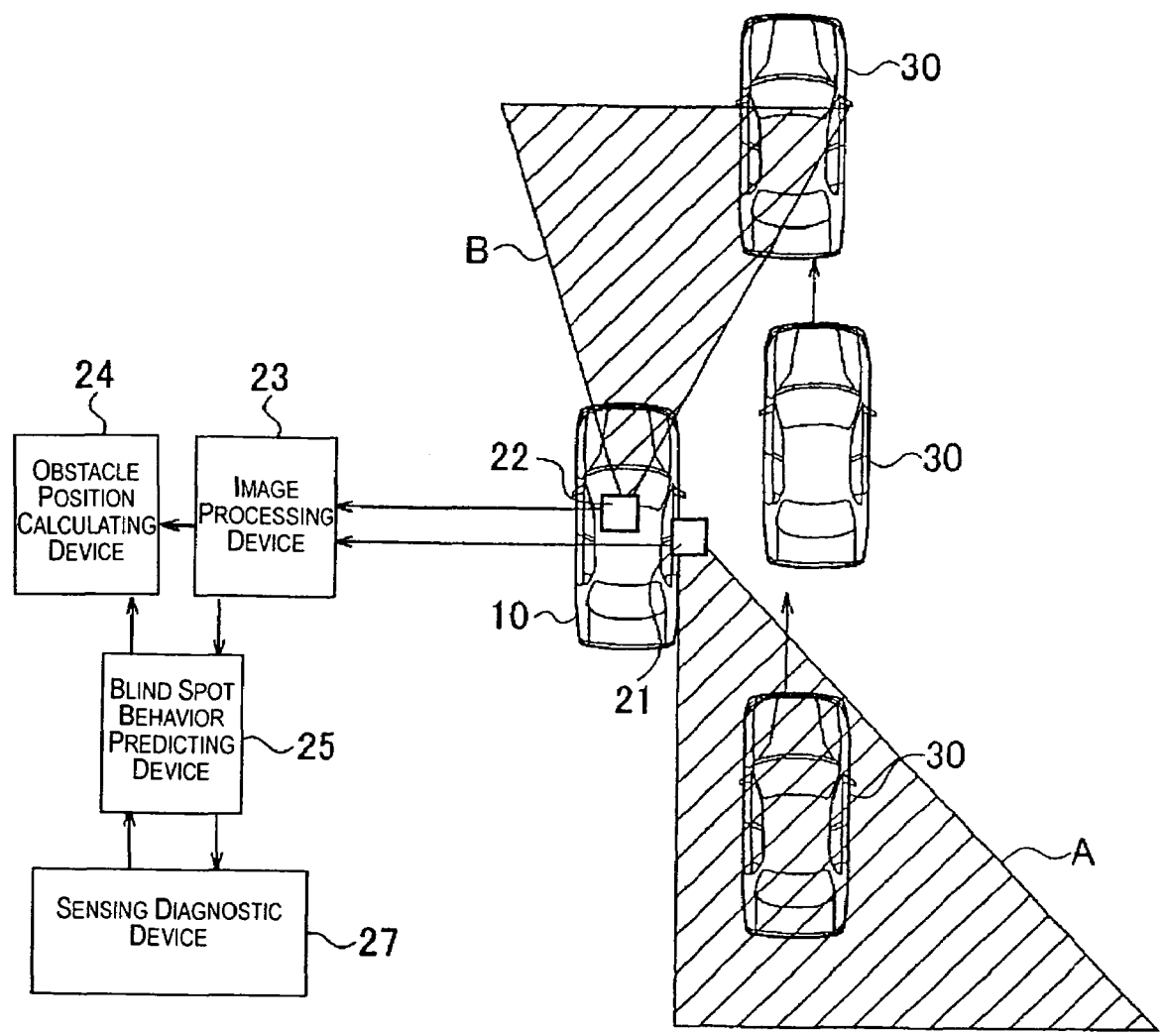
FIG. 8 is a simplified block diagram illustrating a basic configuration of a vehicle obstacle detecting device in accordance with a third embodiment of the present invention.
Figure 9:
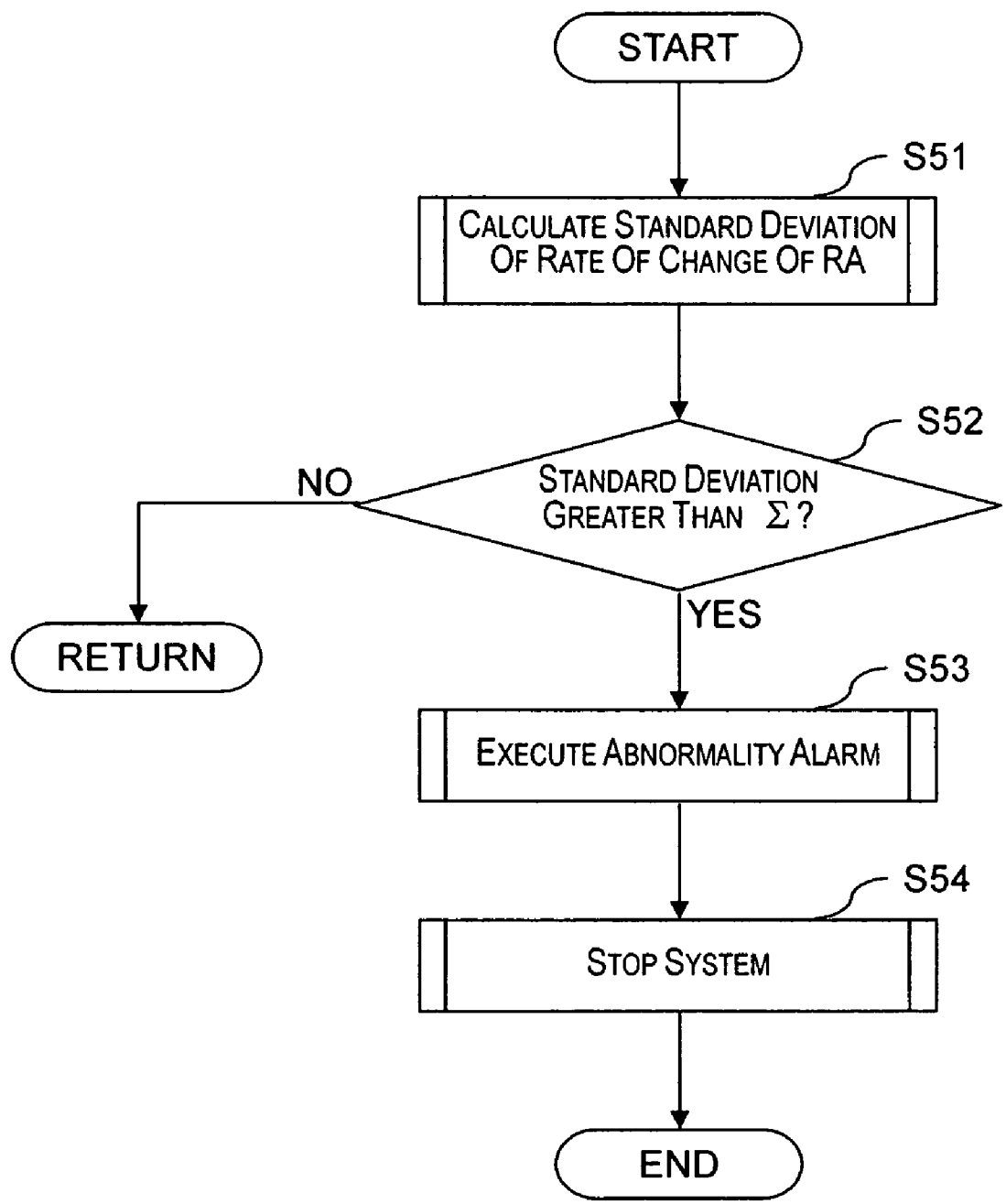
FIG. 9 is a flowchart for explaining the processing sequence for conducting a system failure diagnosis executed by the vehicle obstacle detecting device in accordance with the third embodiment of the present invention.

Referring now to FIGS. 8 and 9, a vehicle obstacle detecting device in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

The third embodiment of the present invention is basically identical to the first embodiment of the present invention, except that the vehicle obstacle detecting device of the third embodiment is further configured to determine whether large discrepancies between the predicted blind spot behavior and the actual behavior of the obstacle are occurring on a frequent basis, and diagnose whether a system abnormality exists based on the result of the determination. In view of the similarity between the first and third embodiments, the vehicle obstacle detecting device of the third embodiment will be described while focusing chiefly on the distinctive features thereof.

As shown in FIG. 8, in addition to the first sensor 21, the second sensor 22, the image processing device 23, the obstacle position calculating device 24, and the blind spot behavior predicting device 25, the vehicle obstacle detecting device of the embodiment comprises a sensing diagnostic device 27 that preferably constitute a diagnostic section configured to determine whether a system abnormality exists in the vehicle obstacle detecting device.

The sensing diagnostic device 27 is configured to determine whether the difference between the position of the obstacle based on the prediction of the blind spot behavior predicting device 25 and the position of the obstacle actually observed by the sensor 21 or 22 is large on a frequent basis. Moreover, the sensing diagnostic device 27 is configured to diagnose whether a system abnormality exists based on the result of the determination. The sensing diagnostic device 27 is configured to deliver a control signal indicating the diagnostic result to the blind spot behavior predicting device 25.

The vehicle obstacle detecting device of the third embodiment is configured to execute basically the same processing sequence as described in the flowcharts of FIGS. 3 and 4 in order to detect the existence of an obstacle in the vicinity of the vehicle 10. Moreover, it will be apparent to those skilled in the art from this disclosure that the vehicle obstacle detecting device of the third embodiment can also be configured to execute the processing sequence described in the flowchart of FIG. 7. In such a case, the sensing diagnostic device 27 is preferably configured to include all the functionalities of the parameter adjustment prohibiting device 26 in the second embodiment. In addition, in the third embodiment of the present invention, the sensing diagnostic device 27 is configured to execute a background processing sequence as described in the flowchart of FIG. 9 to diagnose the system after the processing sequences described in FIGS. 3 and 4 or FIGS. 3, 5 and 7 have completed.

More specifically, as shown in FIG. 9, in step S51 the sensing diagnostic device 27 of the vehicle obstacle detecting device is configured to calculate the standard deviation of the rate of change of the calculated adjusting coefficient RA. Then, in step S52, the sensing diagnostic device 27 is configured to determine whether the calculated standard deviation is larger than a preset numerical value $\Sigma$.

If the sensing diagnostic device 27 determines that the calculated standard deviation is larger than the preset numerical value $\Sigma$, the sensing diagnostic device 27 is configured to determine that the system is not abnormal and end the processing sequence.

Meanwhile, if the sensing diagnostic device 27 determines that the calculated standard deviation is larger than the preset numerical value $\Sigma$, the sensing diagnostic device 27 is configured to determine that there is an abnormality in the system because there is the possibility that the prediction value is experiencing large fluctuations on a continuous basis, e.g., when the large fluctuation occurs with a prescribed amount of frequency.

In step S53, the vehicle obstacle detecting device is configured to execute a prescribed alarm operation to inform the driver of the abnormality of the vehicle obstacle detecting device. In step S54, the vehicle obstacle detecting device is configured to stop the system of the vehicle obstacle detecting device and end the processing sequence.

Thus, by executing the processing sequences described in the flowchart of FIG. 9, the vehicle obstacle detecting device of the third embodiment can conduct a system diagnosis using the sensing diagnostic device 27.

Accordingly, in the vehicle obstacle detecting device in accordance with the third embodiment, the sensing diagnostic device 27 is configured to execute a background processing sequence to determine whether large discrepancies between the predicted blind spot behavior and the actual behavior of the obstacle are occurring on a frequent basis. Then, the vehicle obstacle detecting device is configured to diagnose whether a system abnormality exists based on the result of that determination. As a result, abnormal operation of the system of the vehicle obstacle detecting device resulting from, for example, the malfunctioning sensor 21 and/or 22 can be ascertained immediately. Thus, the reliability of the vehicle obstacle detecting device can be improved.

Of course, the present invention is not limited to the first, second and third embodiments described above. For example, although the existence of an obstacle is detected using two sensors (first and second sensors 21 and 22) in the above explained embodiments, the present invention can also be applied to a situation in which three or more sensors are used.

Also, although the vehicle obstacle detecting device is described as if the vehicle obstacle detecting device comprises devices that a physically separate from one another in the above explained embodiments, an entire or part of functionalities of these devices of the vehicle obstacle detecting device can also be configured as a software that can be executed using a CPU (central processing unit) or the like. Even in the case of embodiments other than those described above, various modifications can be made in accordance with the design and other conditions so long as the modifications do not deviate from the technical concept of the present invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-271921. The entire disclosure of Japanese Patent Application No. 2003-271921 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle obstacle detecting device adapted to be mounted on a vehicle to detect an obstacle, comprising:
  a plurality of sensors including at least a first sensor having a sensing scope that does not substantially overlap a sensing scope of the second sensor thereby defining a blind spot between the sensing scopes of the first and second sensors;
  an obstacle behavior observing section configured to observe a behavior of an obstacle within at least the sensing scope of the first sensor; and
  a blind spot behavior predicting section configured to predict a blind spot behavior of the obstacle in the blind spot between the sensing scopes of the first and second sensors based on the behavior of the obstacle in the sensing scope of the first sensor observed by the obstacle behavior observing section, the blind spot behavior predicting section is configured to obtain the blind spot behavior of the obstacle by using at least one parameter, and to adjust the at least one parameter based on a difference between the blind spot behavior and an actual behavior of the obstacle within the blind spot so that a blind spot behavior of a next obstacle within the blind spot is predicted using the at least one parameter.

2. The vehicle obstacle detecting device as recited in claim 1, wherein
  the blind spot behavior predicting section is configured to obtain a predicted position of the obstacle within the blind spot after the obstacle departs from the sensing scope of the first sensor by using the at least one parameter, and to adjust the at least one parameter based on a difference between the predicted position and an actual position of the obstacle when the obstacle enters the sensing scope of the second sensor.

3. The vehicle obstacle detecting device as recited in claim 1, wherein
  the blind spot behavior predicting section is configured to obtain a predicted time when the obstacle will enter the sensing scope of the second sensor after the obstacle departs from the sensing scope of the first sensor, and to adjust the at least one parameter based on a difference between the predicted time and an actual time when the obstacle enters the sensing scope of the second sensor.

4. The vehicle obstacle detecting device recited in claim 2, further comprising
  an adjustment prohibiting section configured to prohibit adjusting the at least one parameter used in the blind spot behavior predicting section to predict the blind spot behavior of the obstacle when the difference between the predicted position and the actual position of the obstacle is larger than a prescribed value.

5. The vehicle obstacle detecting device recited in claim 3, further comprising
  an adjustment prohibiting section configured to prohibit adjusting the at least one parameter used in the blind spot behavior predicting section to predict the blind spot behavior of the obstacle when the difference between the predicted time and the actual time of the obstacle is larger than a prescribed value.

6. The vehicle obstacle detecting device as recited in claim 1, wherein
  the obstacle behavior observing section is further configured to set a hypothetical position of the obstacle when the blind spot behavior predicting section is unable to predict the blind spot behavior of the obstacle.

7. The vehicle obstacle detecting device as recited in claim 1, further comprising
  a diagnostic section configured to diagnose an abnormality of the vehicle obstacle detecting device by determining whether the difference between the blind spot behavior and the actual behavior of the obstacle when the obstacle enters the sensing scope of the second sensor is larger than a prescribed value with a prescribed amount of frequency.

8. A method for detecting an obstacle in a vicinity of a vehicle, comprising:
sensing a first area adjacent the vehicle to define a first sensing scope;
sensing a second area adjacent the vehicle to define a second sensing scope that does not substantially overlap with the first sensing scope such that a blind spot is defined between the first and second sensing scopes;
observing a behavior of an obstacle within the first sensing scope;
predicting a blind spot behavior of the obstacle in the blind spot between the first and second sensing scopes based on the behavior of the obstacle in the first sensing scope observed by the obstacle behavior observing section;
obtaining the blind spot behavior of the obstacle by using at least one parameter; and
adjusting the at least one parameter based on a difference between the blind spot behavior and an actual behavior of the obstacle within the blind spot so that a blind spot behavior of a next obstacle within the blind spot is predicted using the at least one parameter.

9. The method as recited in claim 8, wherein
the obtaining of the blind spot behavior includes obtaining a predicted position of the obstacle within the blind spot after the obstacle departs from the first sensing scope by using the at least one parameter, and adjusting the at least one parameter based on a difference between the predicted position and an actual position of the obstacle when the obstacle enters the second sensing scope.

10. The method as recited in claim 8, wherein
the obtaining of the blind spot behavior includes obtaining a predicted time when the obstacle will enter the first sensing scope after the obstacle departs from the first sensing scope, and adjusting the at least one parameter based on a difference between the predicted time and an actual time when the obstacle enters the second sensing scope.

11. The method recited in claim 9, further comprising
prohibiting adjusting the at least one parameter used in the blind spot behavior predicting section to predict the blind spot behavior of the obstacle when the difference between the predicted position and the actual position of the obstacle is larger than a prescribed value.

12. The method recited in claim 10, further comprising
prohibiting adjusting the at least one parameter used in the blind spot behavior predicting section to predict the blind spot behavior of the obstacle when the difference between the predicted time and the actual time of the obstacle is larger than a prescribed value.

13. The method as recited in claim 8, further comprising
setting a hypothetical position of the obstacle when the blind spot behavior is unable to be predicted.

14. The method as recited in claim 8, further comprising
diagnosing an abnormality by determining whether the difference between the blind spot behavior and the actual behavior of the obstacle when the obstacle enters the second sensing scope of the second sensor is larger than a prescribed value with a prescribed amount of frequency.

15. A vehicle obstacle detecting device adapted to be mounted on a vehicle to detect an obstacle, comprising:
detecting means for detecting an obstacle within a plurality of prescribed sensing scopes, the prescribed sensing scopes defining a blind spot where the obstacle is undetectable by the detecting means;
observing means for observing a behavior of the obstacle within one of the prescribed sensing scopes; and
predicting means for predicting a blind spot behavior of the obstacle in the blind spot based on the behavior of the obstacle observed by the observing means;
obtaining means for obtaining the blind spot behavior of the obstacle by using at least one parameter; and
adjusting means for adjusting the at least one parameter based on a difference between the blind spot behavior and an actual behavior of the obstacle within the blind spot so that a blind spot behavior of a next obstacle within the blind spot is predicted using the at least one parameter.

* * * * *